H. TAMPKIN
Jan. 6, 1931. WIRE FABRIC Re. 17,920
Original Filed Jan. 19, 1928
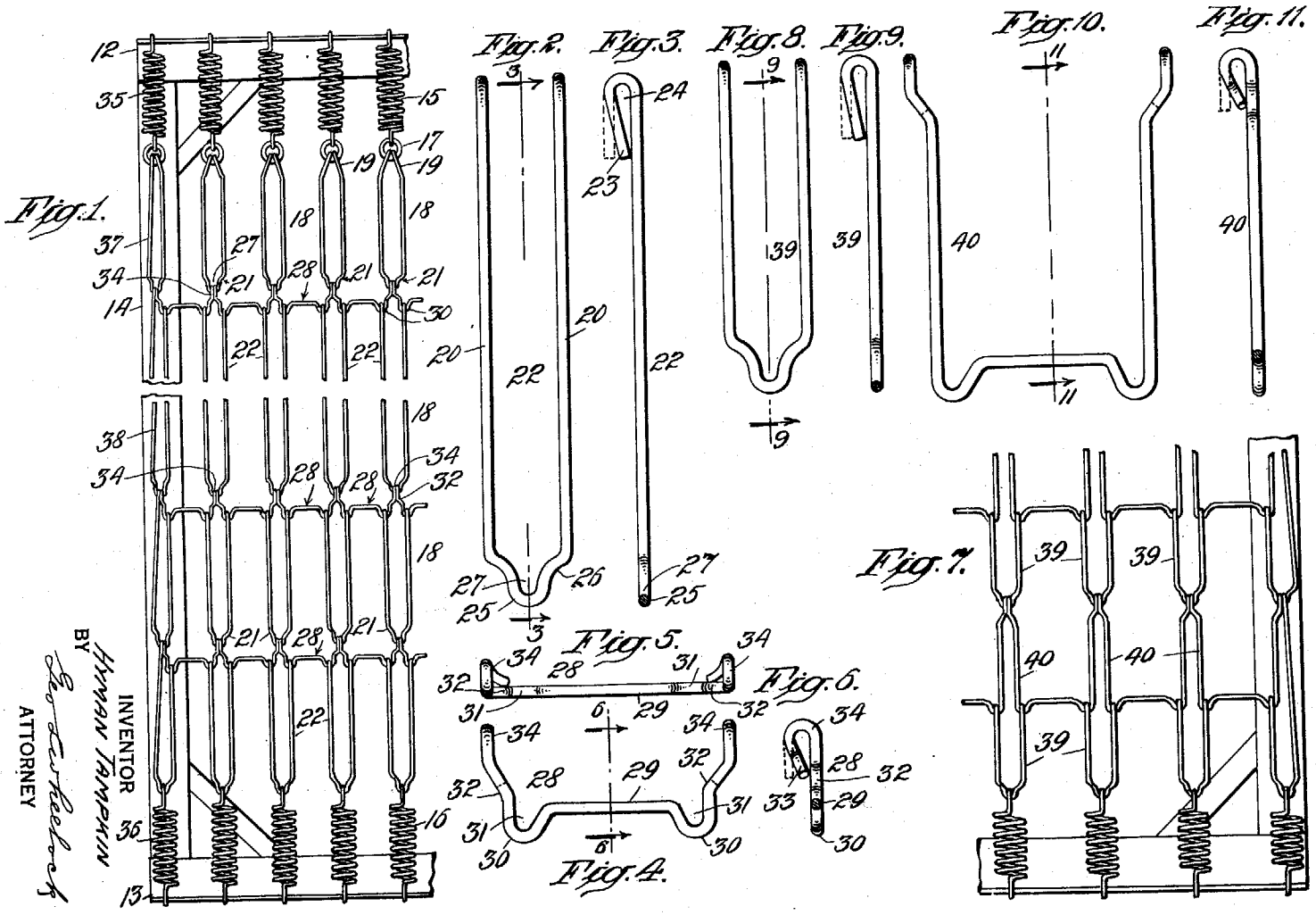
INVENTOR
HYMAN TAMPKIN
BY
Geo. L. Wheelock
ATTORNEY Reissued Jan. 6, 1931

Re. 17,920

UNITED STATES PATENT OFFICE

HYMAN TAMPKIN, OF BROOKLYN, NEW YORK

WIRE FABRIC

Original No. 1,686,110, dated October 2, 1928, Serial No. 247,796, filed January 19, 1928. Application for reissue filed October 31, 1929. Serial No. 403,924.

This invention relates to wire fabrics such as more particularly used in beds, couches, and like articles of furniture.

An object of the present invention is to provide a wire fabric having links which are specially formed and which are so arranged that the fabric possesses the required flexibility, yet is sufficiently rigid so that it will not sag or be unstable in the direction of its own plane, these objects being attained by specially constructing the two kinds or types of links which are employed. These objects are accomplished at no greater expense than in the case of wire fabrics now on the market.

These being among the objects of the present invention, the same consists of certain features of construction and combinations of parts to be hereinafter described and then claimed with reference to the accompanying drawings showing preferred embodiments of the invention and in which:

Fig. 1 is a plan of one form of the improved wire fabric;

Fig. 2 is a plan of one kind of link;

Fig. 3 is a section on the line 3—3, Fig. 2;

Fig. 4 is a plan of another kind of link used in the same fabric;

Fig. 5 is an edge view of the same link;

Fig. 6 is a section thereof on the line 6—6, Fig. 4;

Fig. 7 is a plan of another form of wire fabric;

Fig. 8 is a plan of one kind of link used therein;

Fig. 9 is a section thereof on the line 9—9, Fig. 8;

Fig. 10 is a plan of another kind of link used in the same fabric; and

Fig. 11 is a section thereof on the line 11—11, Fig. 10.

Referring to Figs. 1 to 6 inclusive, the side rails 12, 13 are partially shown and one of the end rails 14 of the frame for supporting the wire fabric. Fabric tensioning springs 15, 16 are respectively connected with side rails 12, 13, the springs 15 carrying rings 17. The wire fabric of the present invention may be constructed as follows:

The fabric comprises alternate rows 18 of spaced links of one kind, each link of the upper row only, as shown, having inwardly bent ends 19 to engage the rings 17, and each link of these rows having an opposite closed end 21. Each link 22 of such rows 18 of spaced links has its opposite sides or arms 20 bent over at 23 so as to form hook-shaped eyes 24. The opposite closed end of each link 22 is formed with a contracted engaging portion or loop 25 which is connected with the straight portions 20 of the arms or side members by means of inwardly bent or bowed diverging portions 26, for the purpose of providing a narrow or contracted throat 27.

Rows 28 of other kinds of links alternate with the rows 18, and the links of alternate rows are arranged in staggered relation with respect to the links of the rows between them. Each link 28 has a main extended body 29 formed with two spaced loop portions 30 which form throats 31. The arms or side members of each link 28, at the extreme ends of the connecting portion formed by the body 29, are formed with outwardly bent portions 32 and the ends of the arms are turned over at 33 to provide hook-shaped eyes 34. It will be noted that the width of the space between the eyes 34 is greater than the distance between the inner ends of the arms of each link 28, which is due to the outward divergence of the portions 32 of the arms. By bending the arms of each link 28 in some such manner, as at 32 the arms of the link are more rigid in a direction from one arm towards the other arm; that is, the said arms are stiffer than would otherwise be the case in a direction in the plane of the entire link 28. It will also be noted that the eyes 34 are substantially parallel with each other, along lines beyond the ends of the main body 29, and also that they are parallel with the inner ends of the arms which are at the converging ends of the diverging portions 32.

The rows of links 18 are combined with the rows of links 28 in the following manner:

The eyes 24 of the end or upper row of links 18 or 22 are engaged with the rings 17. The contracted portion or loop 25 of each link 22 receives two eyes 34, 34 of two adjoining links 28, 28, and the next link of the row 18 is similarly engaged by two arms of two links 28, 28, and so on in that direction across the fabric. The links of each row 18 extend in one general direction from side rail to side rail, and the alternating rows of the dissimilar links 28 extend generally transversely to the general direction of the links of the rows 18. The eyes of the next row 18 of links are engaged preferably with the two loop portions 30, 30 of two adjoining links 28, 28, that is, with the extreme ends of the connecting portions of the arms of said adjoining links, and the fabric is built up in that way substantially throughout, so that there are rows of links 18 of one kind which alternate with rows of links 28 of the other kind. The arms of the links 28 extend in the same general direction as the links 18, and the links of any two adjacent rows are in offset relation in one row to the other row.

When suitable tension is placed upon the so-built-up fabric it will be held quite taut by means of the tensioning springs 15, 16, with which the links are suitably connected. Other springs 35, 36 are at the ends of the side rails 12, 13 for tensioning in the usual manner the border links 37, 38. The border links 37, 38 finish the fabric and at the same time give the necessary stiffness to the fabric in a direction lengthwise of the side rails 12, 13.

While the construction illustrated and described produces a more or less rigid structure it is not too rigid to allow of the desired flexibility of action. In this connection it will be noted that the inward bows 26 of the links 22 make them more rigid than otherwise, due to the fact that the inwardly bowed portions 26 are bent in the plane of the link 22, in this respect functioning somewhat similarly to the outward bends 32 of the other links 28. Also it will be noted that the location or fixing of the eyes 34 of the links 28 in position in the closed ends of the links 22 is rendered more definite and certain by reason of the contracted throats 27 of the links 22; and it will also be noted that the eyes 34 of the links 28 are substantially parallel, and that where these eyes of two separate adjacent links 28 engage in any one throat 27, they bear mutually one on the other for some distance, so as to render these connections more reliable. The parallel bearing surfaces of the arms of the links 28 thus contribute to the general firmness or steadiness of the wire fabric in its own plane, while at the same time the fabric is sufficiently resilient for the intended purpose. In other words, the bends at the ends of the diverging portions 32 tend to stiffen the arms of each link 28 without detracting from the desired resiliency of the fabric or of the arms in their own plane, and the divergence of said portions 32 thus affords a firmer bearing relation between the eyes 34 than would be the case if the arms of links 28 extended in continuous straight parallel lines from the bends or loops 30.

In Fig. 7 another form of the improved fabric is illustrated, and in this form the principles and general construction are the same, except that the links 39 which correspond with the links 22 of the other form are shorter, while the links 40 which correspond with the links 28 of the other form have longer arms. In other words, the links 39 and 40 are of substantially the same or coequal length in the direction of their arms.

What I claim as new is:

1. A wire fabric including alternate rows of links, one row comprising spaced links which extend in one general direction, the closed end of each of the spaced links having a contracted engaging portion, such engaging portion joining the sides of each of said links by inwardly bowed portions, and the opposite ends of each such link having eyes; and the second row of links comprising links which extend generally transversely to the general direction of the links of the other row, and each of such links of the second row provided with arms which extend in the same general direction as the links of the other row, said arms having eyes, whereby two eyes of adjoining links of such second row of links engage the contracted portion of a spaced link and so on across the fabric, each of the second-row links having two spaced loop portions, and the loop portions of each second-row link respectively engaged with one of the eyes of a link of the other row and one of the eyes of the next link of the other row and so on across the fabric, whereby the links of the two rows are arranged in offset relation, such construction and arrangement being repeated throughout the fabric.

2. A wire fabric including alternate alternate rows of links, one row comprising spaced links which extend in one general direction, the closed end of each of the spaced links having a contracted engaging portion and the opposite ends of each such links having eyes; and the second row of links comprising links which extend generally transversely to the general direction of links of the other row, and each of such links of the second row provided with arms which extend in the same general direction as the links of the other row, said arms having eyes, whereby two eyes of adjoining links of such second-row links engage the contracted portion of a spaced link and so on across the fabric, each of the second-row links having two spaced loop portions, and the eyes of each second-row link being in parallelism at the diverging ends of portions bent outwardly away from the loop portions of the link, and the loop portions of each second-row link respectively engaged with one of the eyes of a link of the other row and one of the eyes of the next link of the other row and so on across the fabric, whereby the links of the two rows are arranged in offset relation, such construction and arrangement being repeated throughout the fabric.

3. A wire fabric including alternate rows of links, one row comprising spaced links which extend in one general direction, the closed end of each of the spaced links having a contracted engaging portion, such engaging portion joining the sides of each of said links by inwardly bowed portions and the opposite ends of each such link having eyes; and the second row of links comprising links which extend generally transversely to the general direction of links of the other row, and each of such links of the second row provided with arms which extend in the same general direction as the links of the other row, said arms having eyes, whereby two eyes of adjoining links of such second-row links engage the contracted portion of a spaced link and so on across the fabric, each of the second-row links having two spaced loop portions, and the eyes of each second-row link being in parallelism at the diverging ends of portions bent outwardly away from the loop portions of the link, and the loop portions of each second-row link respectively engaged with one of the eyes of a link of the other row and one of the eyes of the next link of the other row and so on across the fabric, whereby the links of the two rows are arranged in offset relation, such construction and arrangement being repeated throughout the fabric.

4. A wire fabric including alternate rows of links, one row comprising spaced links which extend in one general direction, the closed end of each of the spaced links having a contracted engaging portion, such engaging portion joining the sides of each of said links by diverging inwardly bowed portions, and the opposite ends of each such link having eyes; and the second row of links comprising links which extend generally transversely to the general direction of the links of the other row, and each of such links of the second row provided with arms which extend in the same general direction as the links of the other row, said arms having eyes, whereby two eyes of adjoining links of such second row of links engage the contracted portion of a spaced link and so on across the fabric, each of the second-row links having the extreme ends of the connecting portion between its arms respectively engaged with one of the eyes of a link of the other row and one of the eyes of the next link of the other row and so on across the fabric, whereby the links of the two rows are arranged in offset relation, such construction and arrangement being repeated throughout the fabric.

5. A wire fabric including alternate rows of links, one row comprising spaced links which extend in one general direction, the closed end of each of the spaced links having a contracted engaging portion and the opposite ends of each such link having eyes; and the second row of links comprising links which extend generally transversely to the general direction of links of the other row, and each of such links of the second row provided with arms which extend in the same general direction as the links of the other row, said arms having eyes, whereby two eyes of adjoining links of such second-row links engage the contracted portion of a spaced link and so on across the fabric, and the eyes of each second-row link being in parallelism at the diverging ends of portions bent outwardly away from the extreme ends of the connecting portion between its arms, and said extreme ends respectively engaged with one of the eyes of a link of the other row and one of the eyes of the next link of the other row and so on across the fabric, whereby the links of the two rows are arranged in offset relation, such construction and arrangement being repeated throughout the fabric.

6. A wire fabric including alternate rows of links, one row comprising spaced links which extend in one general direction, the closed end of each of the spaced links having a contracted engaging portion, such engaging portion joining the sides of each of said links by inwardly bowed portions and the opposite ends of each such link having eyes; and the second row of links comprising links which extend generally transversely to the general direction of links of the other row, and each of such links of the second row provided with arms which extend in the same general direction as the links of the other row, said arms having eyes, whereby two eyes of adjoining links of such second-row links engage the contracted portion of a spaced link and so on across the fabric, and the eyes of each second-row link being in parallelism at the diverging ends of portions bent outwardly away from the extreme ends of the connecting portion between its arms, and said extreme ends respectively engaged with one of the eyes of a link of the other row and one of the eyes of the next link of the other row and so on across the fabric, whereby the links of the two rows are arranged in offset relation, such construction and arrangement being repeated throughout the fabric.

HYMAN TAMPKIN.